UNITED STATES PATENT OFFICE.

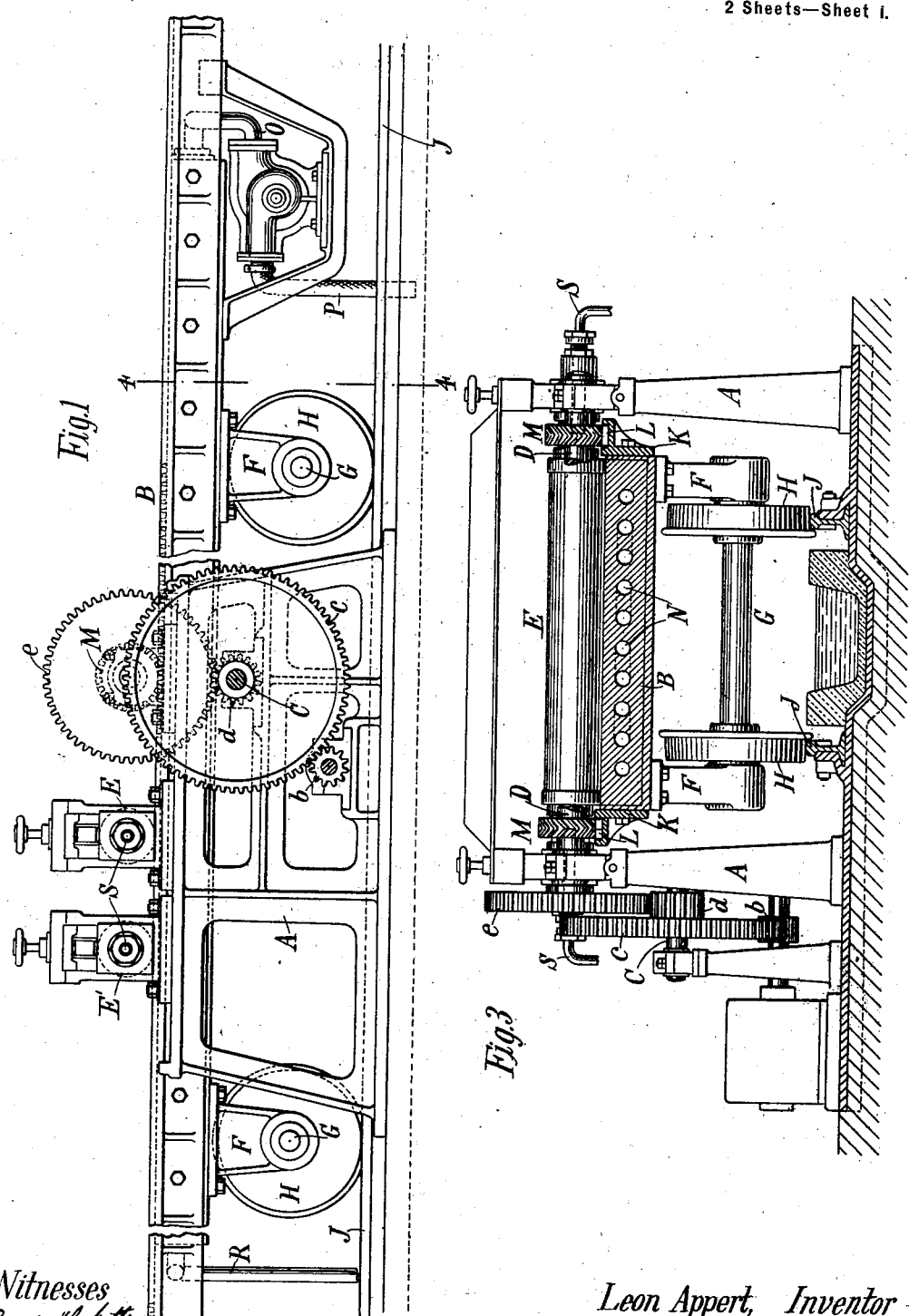

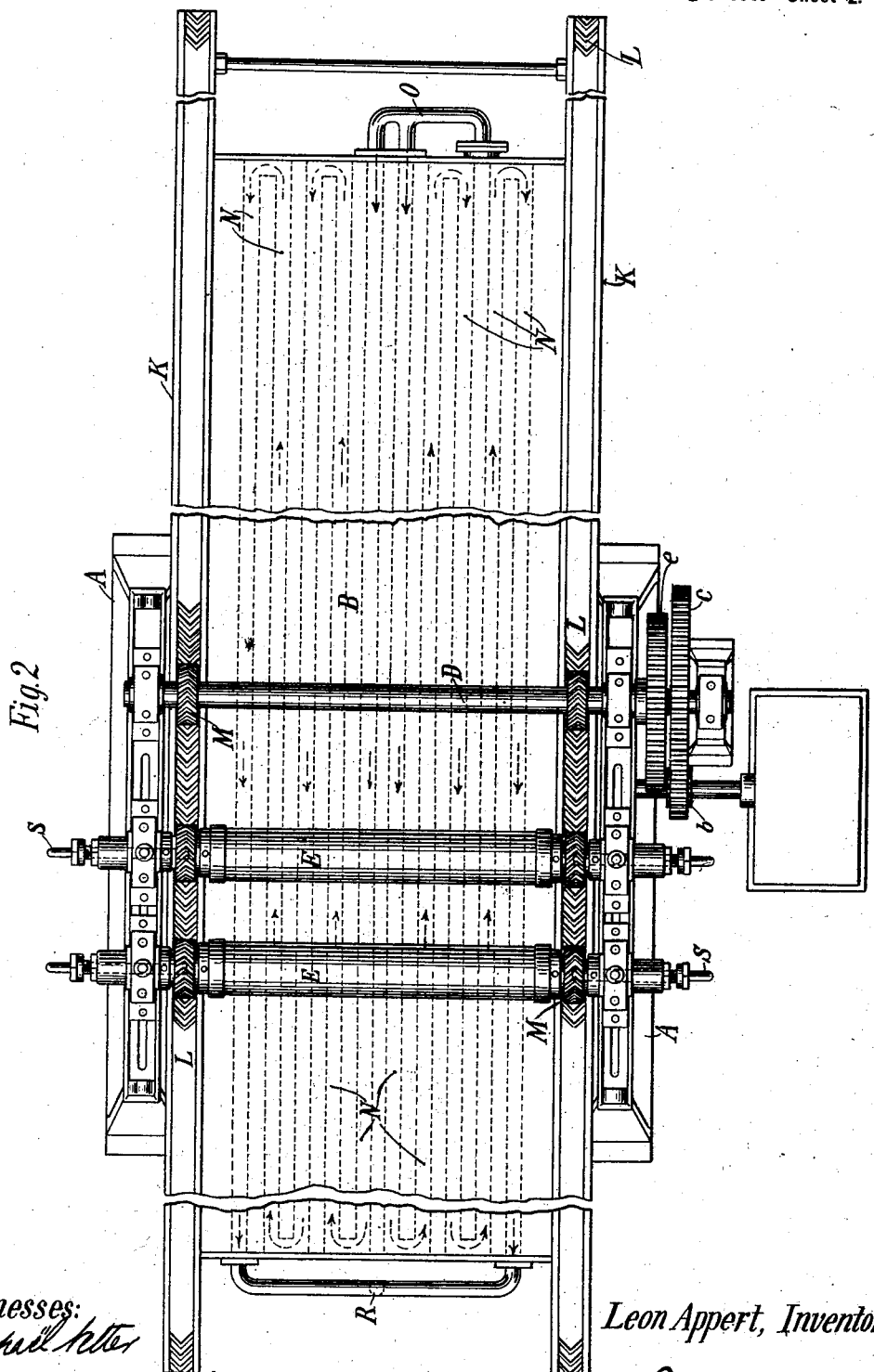

LEON APPERT, OF PARIS, FRANCE, ASSIGNOR TO THE APPERT GLASS COMPANY, A CORPORATION OF NEW JERSEY.

MACHINE FOR MAKING GLASS PLATES.

SPECIFICATION forming part of Letters Patent No. 710,032, dated September 30, 1902.

Application filed February 6, 1901. Serial No. 46,167. (No model.)

*To all whom it may concern:*

Be it known that I, LEON APPERT, a citizen of the Republic of France, residing at Paris, France, have invented certain new and useful Improvements in Machines for Making Glass Plates, of which the following is a specification, reference being had to the drawings accompanying and forming a part of the same.

In the manufacture of plate-glass, or, more generally speaking, glass in the form of plates or sheets, it has heretofore been usual to place a mass of glass, just as taken from the pot, upon a metallic bed or table and to pass over it while still in a plastic condition one or more rolls for spreading it out in a flat sheet or plate. It is, however, difficult to obtain by this process plates of approximately even thickness, for reasons which I have discovered to be largely due to defects inherent in the machinery or apparatus hitherto employed for the purpose. Chief among these defects is the tendency, especially noticeable in the table or bed when in constant use and the rolls, to expand locally at the points where the mass of molten glass is deposited, thus producing a slight elevation of the table or bed, which makes the rolled plate correspondingly thinner at such point. Efforts have been made to prevent this by artificially cooling the table, as by directing against its face a blast of air or against its under side a blast of air or jets of water; but these have proved ineffectual, and the only practical way of avoiding the effects of heating of the table which, so far as I am aware, has been heretofore employed has been to have a large number of tables and to use them successively.

The invention subject of my present application for Letters Patent is an improvement in the art of manufacturing plates of glass by the process and machines above described and constitutes a marked and highly-important advance in such art in that it enables me to use a single table continuously for any length of time, and thereby to roll an increased number of plates and to obtain with it plates with more perfect surfaces than with the ordinary machines and of more uniform thickness, which is a highly-important advantage in connection with annealing.

The more prominent features of my improvement reside in a means for cooling the table and roll or rolls by a system of passages or channels for the circulation of water through the body of said table and rolls and in the employment, in combination with one or more rolls mounted in stationary bearings, of a reciprocating table or bed.

The invention, however, includes other features of novelty in the construction and arrangement of the apparatus, which will be more readily understood by reference to the accompanying drawings.

Figure 1 is a side elevation of a machine embodying the invention above referred to. Fig. 2 is a top plan view of the same. Fig. 3 is a cross-section of the machine on line 4 4 of Fig. 1.

The mechanism as a whole comprises two main portions—a stationary frame A and a reciprocating table or bed-plate B. In the former are mounted the power-shaft C, a counter-shaft D, and one or more rolls E E', all in stationary bearings, except that those for the rolls are adjustable with reference to the level of the table.

The power is preferably derived from an electromagnetic motor through a pinion $b$ engaging with a gear-wheel $c$ on the power-shaft and transmitted to the counter-shaft through a pinion $d$ on the former engaging with a gear-wheel $e$ on the latter. The rolls are free to rotate, but are not directly in gear with the driving mechanism.

The number of rolls is not an element of the invention. If it be desired to simply produce skylight or plate glass, one roll, as E, will suffice; but if wire-glass is to be manufactured two or more rolls will be necessary—one to spread the glass, the other or others to incorporate therewith the wire netting or fabric. In either case the surface of the rolls may be plain or corrugated or otherwise prepared for the production of special or ornamental effects.

The table B is composed of an extended bed-plate, of iron or steel, either solid or ribbed, and supported by supports F, in which are journal-bearings for the axles G, carrying flanged wheels H, running on the rails or guides J of a truck built upon a very solid and rigid bed.

Secured to the sides of the bed or table A are heavy angle-irons K, provided along their upper faces with rack-bars L, extending the whole length of the table. With these rack-bars mesh pinions M on the counter-shaft D and also on the shafts of the rolls, the teeth on both racks and pinions being preferably of V shape and constituting what is known as a "V-gear." The table by this means is caused to travel back and forth on its track by the rotation of the motor and power-shaft in opposite directions and in its movement imparts rotation to the roll or rolls E E', the gears of the latter being matched, so that the rolls move at the same speed as the table below it. In the bed of the table there are formed a number of parallel channels or passages N, preferably circular or oval in cross-section. These passages may be formed in the solid bed or by iron or steel pipes run through suitable passages in the bed and constitute channels for the circulation of a cooling medium, such as water. The passages are so connected with one another as to form two independent channels running back and forth from one end of the table to the other, both having their inlets as nearly as practicable to the center line of the table and their outlets at opposite sides thereof. This arrangement is shown in Fig. 2, in which O is a pipe through which water is delivered from a pump or any other suitable source at the desired pressure and temperature. A flexible hose P is usually employed to connect the pipe O with the source. The pipe O is branched, as shown, so as to direct a flow of water into each of the two channels described, and this flow after circulating back and forth from the center line to the edges of the table leaves the table through a common outlet R. The same water may be used over again after having been cooled.

In addition to the channels in the table others are provided through the rolls E E'. For this purpose the said rolls may be cast hollow and provided with hollow journal-bearings, through which water from pipes S is caused to flow. The usual construction illustrated in Fig. 3 is adequate for this purpose.

In using this machine a flow of water is started through the rolls and the channels in the table. A mass of molten glass is then deposited on the table, as nearly as practicable on the center line, and the table then moved under the rolls, which operate to spread out and roll the glass into a sheet or plate. During the process the flow of water may be varied as may be necessary to prevent undue heating of the table and rolls and according to the necessities arising from variations of heat to maintain the proper relative temperature of the table and rolls, so that the upper surface of the glass may not be materially hotter or cooler than the under surface.

A special advantage is derived from the plan of introducing the water at the central section of the table and discharging it at the sides, as the coolest water is thus presented at the points which are subjected to the highest temperature, owing to the fact that the glass is poured upon the center line of the table and becomes cooler as it is spread out toward the sides.

By my improvements as above set forth I am enabled to use a single table continuously in lieu of a plurality of tables, while at the same time I avoid the risk of damage to the table by overheating.

Having now described my invention, what I claim is—

1. In a machine for rolling glass plates, the combination with one or more rolls and a table for receiving glass, of a fluid-circulating system arranged to be employed for cooling the said table, having its inlet arranged relatively close to the central portion of the table upon which the molten glass is poured, and its outlet relatively far from such portion, substantially as and for the purposes set forth.

2. In a machine for rolling glass plates, the combination with one or more rolls, of a table for receiving the glass to be acted on by the rolls, and provided with channels or passages in its bed for the circulation of water, said channels having inlets at the center line or section of the table and outlets at the sides, whereby the water in passing through the channel is caused to flow from the center of the table toward its sides, as set forth.

3. In a machine for rolling glass plates the combination with one or more rolls mounted on stationary bearings, of a longitudinally-movable table, having channels or passages in its bed, with inlets at the center line or section of the table and outlets at the sides, and flexible connections between the inlets and a source of water-supply, as set forth.

LEON APPERT.

Witnesses:
ARTHUR SINNARD,
GEORGES SINNARD.